(12) United States Patent
Miernik et al.

(10) Patent No.: US 7,191,231 B2
(45) Date of Patent: Mar. 13, 2007

(54) SYSTEM AND METHOD FOR CONSISTENT FORWARDING OF PACKETS ACROSS WIRELESS AND WIRELINE NETWORKS

(75) Inventors: Jerzy W. Miernik, Allen, TX (US); Aleksandr Garbuz, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 933 days.

(21) Appl. No.: 10/365,752

(22) Filed: Feb. 12, 2003

(65) Prior Publication Data

US 2004/0158646 A1  Aug. 12, 2004

(51) Int. Cl.
*G06F 15/16* (2006.01)
*G06F 15/173* (2006.01)

(52) U.S. Cl. ............... 709/225; 709/226; 379/211.02; 455/428

(58) Field of Classification Search ............... 709/224, 709/225, 226, 238; 455/428, 12.1, 406; 370/466; 379/211.02, 218.01
See application file for complete search history.

(56) References Cited

U.S. PATENT DOCUMENTS

| 5,276,731 A | * | 1/1994 | Arbel et al. | ........... 379/211.02 |
| 6,005,870 A | * | 12/1999 | Leung et al. | ............... 370/466 |
| 6,058,307 A | * | 5/2000 | Garner | ....................... 455/428 |

(Continued)

FOREIGN PATENT DOCUMENTS

| EP | 1 059 792 A2 | 12/2000 |
| EP | 1 104 216 A1 | 5/2001 |

(Continued)

OTHER PUBLICATIONS

Notification of Transmittal of the International Search Report or the Declaration (PCT Rule 44.1) mailed Jul. 9, 2004 (16 pages) re International Application No. PCT/US2004/03131.

(Continued)

*Primary Examiner*—Khanh Dinh
(74) *Attorney, Agent, or Firm*—Baker Botts L.L.P.

(57) ABSTRACT

A method for consistent forwarding of data is provided. The method includes storing a plurality of correlations between a set of wireline communication priority levels and a set of wireless communication priority levels. The method further includes receiving data from an application via a wireline communications network. The data is received according to a wireline communication priority level assigned to the data from the set of wireline communication priority levels. The method further includes determining from the set of wireless communication priority levels a wireless communication priority level for the data based at least in part on the wireline communication priority level associated with the data and one or more of the plurality of correlations. The method further includes transmitting the data to a mobile station according to the wireless communication priority level determined for the data.

52 Claims, 5 Drawing Sheets

U.S. PATENT DOCUMENTS

| | | | |
|---|---|---|---|
| 6,185,409 B1 * | 2/2001 | Threadgill et al. | 455/12.1 |
| 6,243,580 B1 * | 6/2001 | Garner | 455/428 |
| 6,628,772 B1 * | 9/2003 | McGrath et al. | 379/218.01 |
| 6,862,622 B2 * | 3/2005 | Jorgensen | 709/226 |
| 7,020,261 B2 * | 3/2006 | McGrath et al. | 379/218.01 |
| 7,058,387 B2 * | 6/2006 | Kumar et al. | 455/406 |
| 2003/0065779 A1 * | 4/2003 | Malik et al. | 709/225 |

FOREIGN PATENT DOCUMENTS

| | | |
|---|---|---|
| EP | 1 113 628 A2 | 7/2001 |

OTHER PUBLICATIONS

Bianchi et al., "A Programmable MAC," Universal Personal Communications, IEEE 1998 International Conference in Florence Italy, Oct. 5-9, 1998, pp. 953-957.

Mikkonen eta l., An Integrated QoS Architecture for GSM Networks, Universal Personal Communications, , IEEE 1998 International Conference in Florence Italy, Oct. 5-9, 1998, pp. 407-403.

* cited by examiner

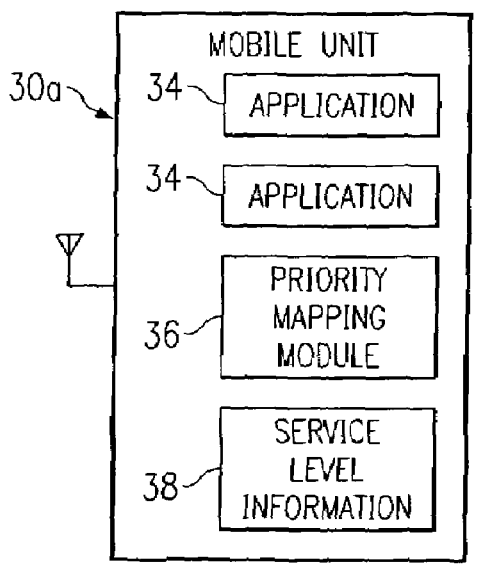
FIG. 3
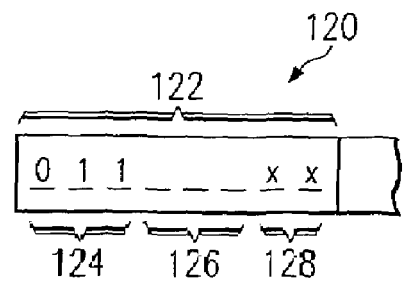
FIG. 5
| CDMA 2000 QoS PRIORITY | DIFF SERV PHB | CLASS SELECTOR CODE POINTS |
|---|---|---|
| 0 0 0 0 | BEST EFFORT | 0 0 0 |
| 0 0 0 1 | BEST EFFORT | 0 0 0 |
| 0 0 1 0 | AF1x | 0 0 1 |
| 0 0 1 1 | AF1x | 0 0 1 |
| 0 1 0 0 | AF2x | 0 1 0 |
| 0 1 0 1 | AF2x | 0 1 0 |
| 0 1 1 0 | AF3x | 0 1 1 |
| 0 1 1 1 | AF3x | 0 1 1 |
| 1 0 0 0 | AF4x | 1 0 0 |
| 1 0 0 1 | AF4x | 1 0 0 |
| 1 0 1 0 | EF | 1 0 1 |
| 1 0 1 1 | EF | 1 0 1 |
| 1 1 0 0 | RESERVED | 1 1 0 |
| 1 1 0 1 | RESERVED | 1 1 0 |
| 1 1 1 0 | RESERVED | 1 1 1 |
| 1 1 1 1 | RESERVED | 1 1 1 |
FIG. 4

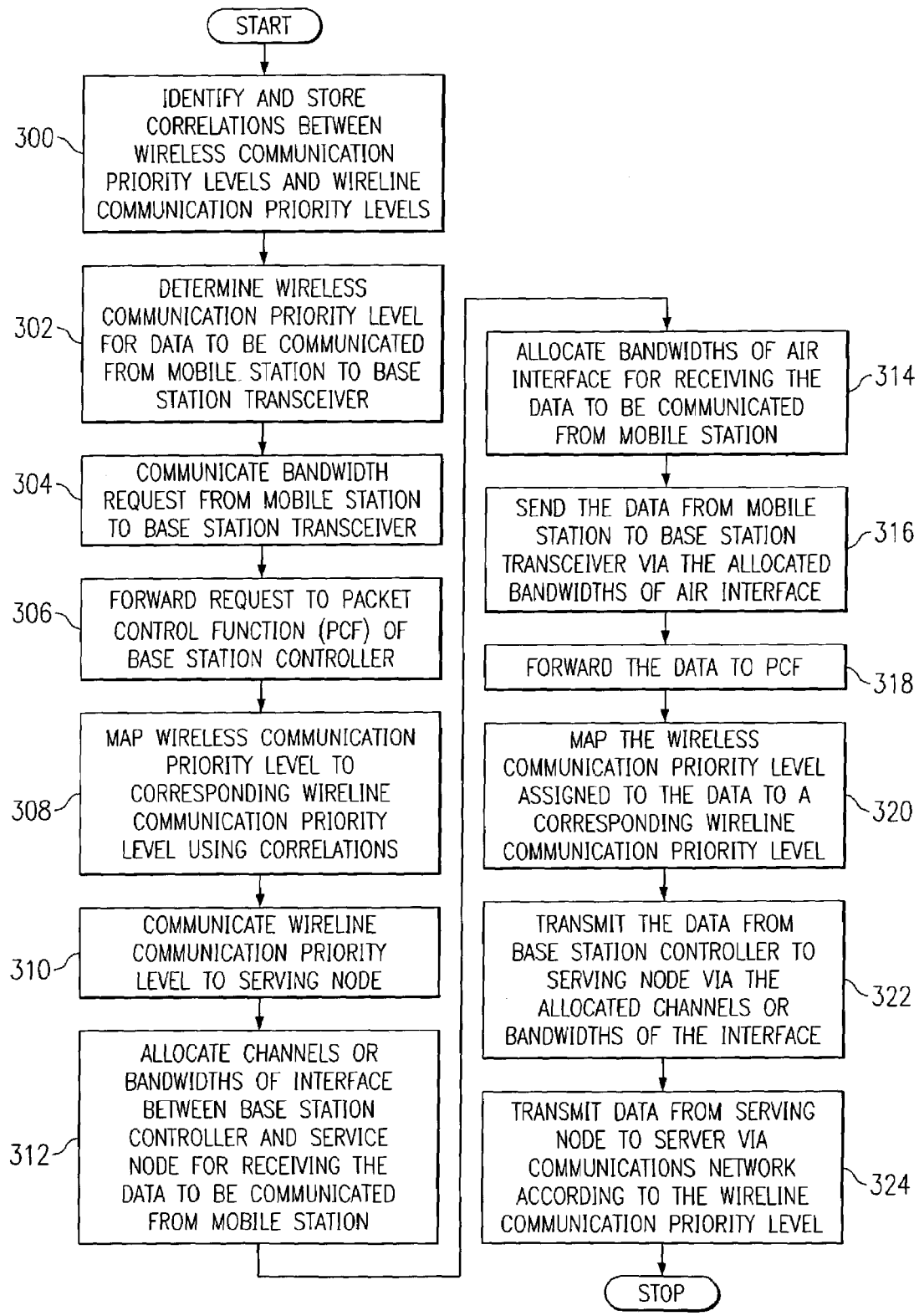

SYSTEM AND METHOD FOR CONSISTENT FORWARDING OF PACKETS ACROSS WIRELESS AND WIRELINE NETWORKS

TECHNICAL FIELD OF THE INVENTION

This invention relates in general to communications systems and, more particularly, to a system and method for consistent forwarding of packets across wireless and wireline networks.

BACKGROUND OF THE INVENTION

Data is often communicated across communication networks according to the priority assigned to the data, or the source of the data, relative to the priority assigned to other data or sources of data. When a communication link of a network is congested, the volume of data which is to be carried over the communication link may exceed the available bandwidth or throughput of the communication link. In such situations, the priority assigned to each packet of data within the volume of data may be used to determine the order in which the packets may be communicated by the communication link, which may include determining how to queue various data packets for transmission.

A communication network including both a wireless network and a wireline network may use one set of priorities for communicating data packets over the wireless network and another set of priorities for communicating data packets over the wireline network. For example, a CDMA 2000 wireless network may use one set of priorities while the wireline network to which the wireless network is connected, such as the Internet, may use another set of priorities. In the CDMA 2000 wireless network, data packets transmitted from a mobile station may be assigned a quality of service (QoS) priority level based on a level of service selected by the user of the mobile station upon registration of the mobile station with the appropriate packet data service provider. Base station controllers of the wireless network may use the QoS subscription priority assigned to each data packet to prioritize requests on the radio, or air, interface in such areas as admission control, data burst allocation, and MAC (Medium Access Control) state management. In a differentiated services (or "diffserv") network, such as the Internet, data packets may be assigned a priority represented by a set of standardized diffserv code points, or class selector code points. Like the wireless QoS priority, the wireline priority, represented by the diffserv code points, may correspond with a level of service provided by a service provider for ensuring forwarding of data packets.

SUMMARY OF THE INVENTION

In accordance with the present invention, systems and methods for consistent forwarding of packets across wireless and wireline networks are provided. Generally, systems and methods are provided which allow for consistent priority-based forwarding of packets across a wireless communication network and a wireline communication network, such as the Internet, where the wireless network and the wireline network use different quality of service (QoS) classifications for forwarding of data packets.

According to one embodiment, a method for consistent forwarding of data is provided. The method includes storing a plurality of correlations between a set of wireline communication priority levels and a set of wireless communication priority levels. The method further includes receiving data from an application via a wireline communications network. The data is received according to a wireline communication priority level assigned to the data from the set of wireline communication priority levels. The method further includes determining from the set of wireless communication priority levels a wireless communication priority level for the data based at least in part on the wireline communication priority level associated with the data and one or more of the plurality of correlations. The method further includes transmitting the data to a mobile station according to the wireless communication priority level determined for the data.

According to another embodiment, another method for consistent forwarding of data is provided. The method includes receiving data from an application via a wireline communications network. The data is received according to a wireline communication priority level assigned to the data from the set of wireline communication priority levels. In addition, the data is intended for a mobile station having a mobile station wireless priority level from a set of wireless communication priority levels. The method further includes receiving from a packet mapping module a mobile station wireline priority level determined from a set of wireline communication priority levels based on the mobile station wireless priority level and one or more correlations between the set of wireline communication priority levels and a set of wireless communication priority levels. The method further includes determining whether to change the wireline communication priority level assigned to the data based on the mobile station wireline priority level. The method further includes changing the wireline communication priority level assigned to the data, and transmitting the data toward the mobile station according to the wireline communication priority level assigned to the data.

According to yet another embodiment, another method for consistent forwarding of data is provided. The method includes storing a plurality of correlations between a set of wireline communication priority levels and a set of wireless communication priority levels. The method further includes receiving data from a mobile station via an air interface. The data is received via the air interface according to a wireless communication priority level assigned to the data from the set of wireless communication priority levels. The method further includes determining from the set of wireline communication priority levels a wireline communication priority level for the data based at least in part on the wireless communication priority level assigned to the data and one or more of the plurality of correlations. The method further includes transmitting the data toward a communications network according to the wireline communication priority level determined for the data.

Various embodiments of the present invention may benefit from numerous advantages. It should be noted that one or more embodiments may benefit from some, none, or all of the advantages discussed below.

One advantage of the invention is that by mapping the wireless priorities to corresponding wireline priorities, data may be communicated across a network including both a wireless portion and a wireline portion with substantially consistent priority-based forwarding. Thus, data packets communicated from a mobile unit may maintain a substantially consistent priority level as they are forwarded across both the radio interface (in other words, the wireless portion) and the appropriate wireline network (such as the Internet, for example). As a result, packets assigned a particular level of service by a data source (such as a mobile unit, or server application, for example) may be forwarded across both the wireless and wireline networks without losing their assigned forwarding priority. This may provide additional incentive for subscribing to particular levels of service, particularly for users of mobile units.

Another advantage of the present invention is that users may be provided with additional levels of service as compared to previous systems and methods. For example, if eight priority levels are available for communication over the radio interface and sixteen priority levels are available for communication over the wireline network, each of the eight wireless priority levels may be mapped to two different wireline priority levels. Thus, mobile users may be offered different levels of service within each of the eight wireless priority levels (such as a standard service and an enhanced service), resulting in sixteen possible levels of service available to the mobile users.

Yet another advantage of the present invention is that wireless communication priorities may be mapped to corresponding wireline communication priorities such that one or more of the wireless and/or wireline communication priorities, such as one or more top priorities, may be reserved for high-priority communications, such as for communicating control traffic for enabling mobile routers which serve mobile networks to connect to a fixed (or wireline) network.

Still another advantage of the present invention is that the mapping of wireless communication priorities to corresponding wireline communication priorities may be dynamic such that the mapping may be updated over time. For example, the mapping may be updated to accommodate expansions or other changes to the set of wireless communication priorities and/or the set of wireline communication priorities. Thus, for example, the expansion of the set of wireline priorities in the future could be accommodated by mapping the current set of wireline priorities to a subset of the set of wireless priorities to make room for the new wireline priorities.

Other advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which:

FIG. 3 illustrates an example mobile unit in accordance with an embodiment of the present invention;

FIG. 4 illustrates an example mapping table in accordance with one such embodiment of the present invention;

FIG. 5 illustrates an example data packet communicated from an application hosted by the server of FIG. 2 in accordance with an embodiment of the present invention;

FIG. 7 illustrates a method for consistent priority-based forwarding of data from a mobile unit to a server in accordance with an embodiment of the present invention.

DETAILED DESCRIPTION OF THE DRAWINGS

Figure 1:
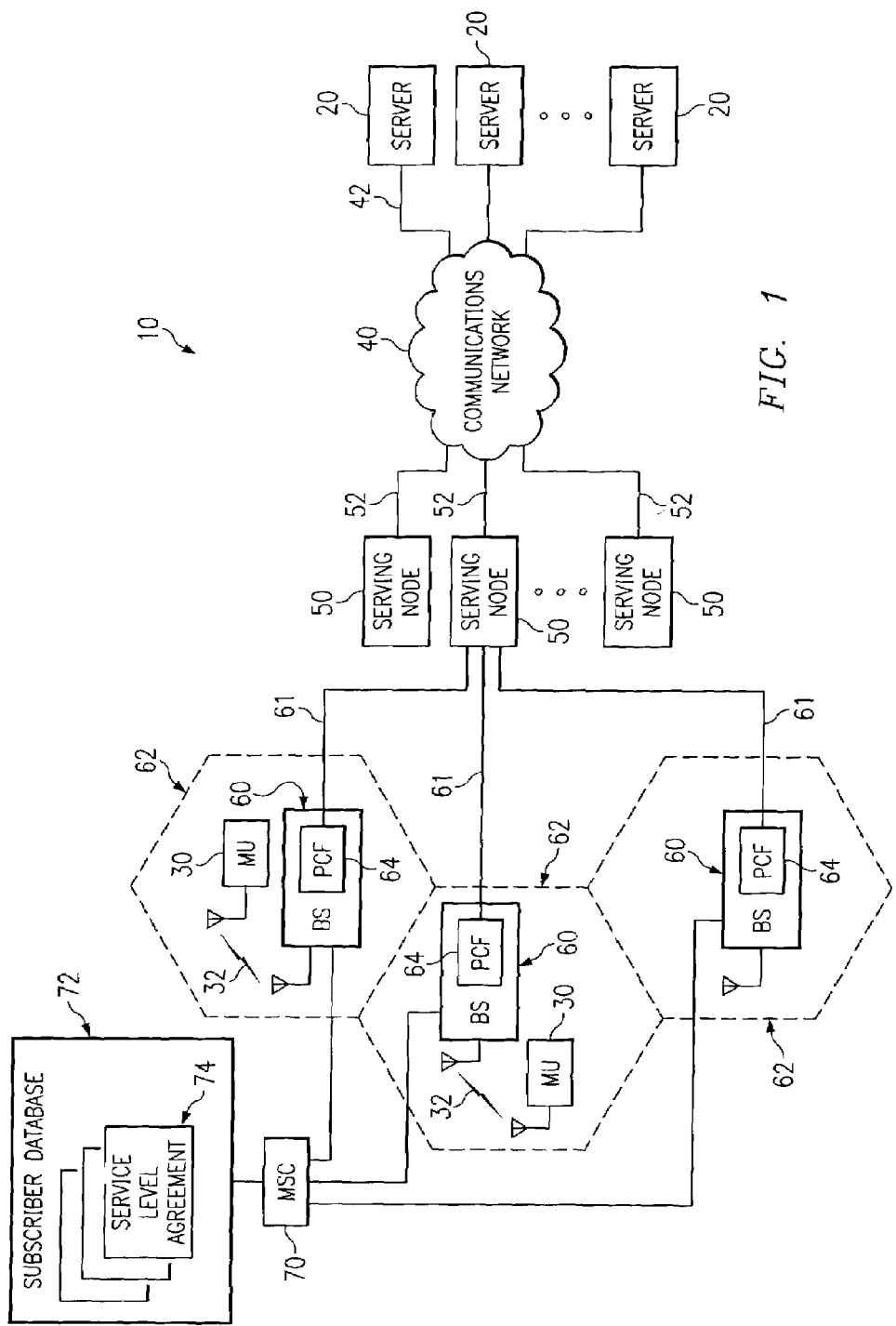
FIG. 1 illustrates a communication system in accordance with one embodiment of the present invention.

FIG. 1 illustrates a communication system 10 in accordance with one embodiment of the present invention. In general, communication system 10 includes servers 20 that may communicate data to and/or from one or more mobile units, or mobile stations, 30 via a communication network 40. Servers 20 may store, generate and/or host applications operable to store or generate data to be sent to mobile units 30 and may provide data to mobile units 30 upon request, such as by using push techniques or in any other appropriate manner. The data may include video, text, audio, voice, and/or any other type of data. In addition, the term "data" is intended to include any unit, group or bundle of data, such as a bit, byte, datagram, frame, message, segment, or cell, for example, which may be transmitted by any one or more types of communications media, such as wireline, optical, wireless, or any other type of communications links.

Servers 20 may be any type of devices that can send data to mobile units 30 and/or assist in managing communication system 10. For example, servers 20 may include stock quote servers, weather forecast servers, e-mail servers, and/or any other appropriate type of data server. As another example, servers 20 may include an accounting server, a location server, and/or any other suitable server for providing services in communication system 10. In particular embodiments, one or more of servers 20 may receive data from mobile units 30. In general, communication system 10 may include any number and/or type of servers 20.

Communication network, or wireline network, 40 assists servers 20 in sending data to and/or receiving data from mobile units 30. Communication network 40 is coupled to servers 20 by communication links 42 which may include one or more wires, fiber-optic cables, microwave channels, and/or any other appropriate type of wireline and/or wireless links. Communication network 40 is operable to forward data received from servers 20 towards mobile unit 30. In particular embodiments, communication network 40 is also operable to forward data received from mobile units 30 to one or more of servers 20. Communication network 40 may include one or more servers, routers, switches, repeaters, backbones, links, and/or any other appropriate type of communication devices coupled by links such as wireline, optical, wireless, or other appropriate links. In general, communication network 40 may include any interconnection found on any communication network, such as a local area network (LAN), metropolitan area network (MAN), wide area network (WAN), the Internet, portions of the Internet, or any other data exchange system created by coupling two or more computers together.

Data communicated from servers 20 may be assigned a wireline communication priority level based on one or more factors such as the service level associated with the server 20, application, or user from which the data were sent, the type of data (such as voice, video, text or voice, for example) being communicated, and the route traveled by the data being communicated, for example. For example, the service level for a particular application from which data are communicated may establish a relatively low priority level for communicating data files and a relatively high priority level for communicating voice or video data. In particular embodiments, the wireline communication priority levels are QoS priority levels as defined by a particular network communications standard. For example, the wireline communication priority levels may be QoS priority levels as defined by an Internet communications standard, such as DiffServ QoS or class selector priority levels.

Communication system 10 also includes one or more serving nodes 50 coupled to communication network 40 by interfaces 52. Each interface 52 provides one or more logical paths for communicating data between communication network 40 and one of the serving nodes 50. Interfaces 52 may include any suitable interface supported by any one or more physical links such as wires, fiber-optic cables, microwave channels, and/or any other appropriate type of wireline and/or wireless links. For example, in particular embodiments, interfaces 52 are Pi interfaces supported by Fast Ethernet or ATM OC-3 physical links. In general, serving nodes 50 are operable to forward data received from communication network 40 towards mobile units 30. In particular embodiments, serving nodes 50 may also be operable to forward data received from mobile units 30 to communication network 40. Serving nodes 50 may be any nodes operable to assist communications between mobile units, such as mobile units 30, and a communication network, such as communication network 40. For example, in a third-generation (3G) environment (such as W-CDMA or CDMA 2000, for example), serving nodes 50 may be packet data serving nodes (PDSN). As another example, in a Global System for Mobile Communications (GSM) environment, serving nodes 50 may be serving GPRS support nodes (SGSN) or gateway GPRS support nodes (GGSN).

Communication system 10 also includes one or more base stations 60. Base stations 60 are coupled to serving nodes 50 by interfaces 61 and are operable to receive data intended for mobile units 30 from serving nodes 50 and communicate the data to mobile units 30 via a wireless link, such as an air interface 32. Base stations 60 may also be operable to receive data from mobile units 30 via a wireless link and send the data towards one or more servers 20. Each base station 60 may provide wireless communication services for one or more mobile units 30 located within a service area 62 associated with the base station 60. Base stations 60 may be any suitable base station for receiving and/or transmitting data from mobile units 30. For example, in 3G environment (such as W-CDMA or CDMA 2000, for example), each base station 60 may be a Base Station System (BSS) and may include one or more Base Transceiver Stations (BTS) and/or one or more Base Station Controllers (BSC). As another example, in a GSM environment, each base station 60 may be a Radio Network Server (RNS) and may include one or more Node B base stations and/or Radio Network Controllers (RNC). Base stations 60 may alternatively comprise any other suitable base station components in other wireless communication environments or under different communication standards.

As shown in the embodiment illustrated in FIG. 1, one or more base stations 60 may be coupled to each serving node 50 by interfaces 61. Each interface 61 provides one or more logical paths for communicating data between one of the base stations 60 and one of the serving nodes 50. Interfaces 61 may include any suitable interface supported by any one or more physical links such as wires, fiber-optic cables, microwave channels, and/or any other appropriate type of wireline and/or wireless links. For example, in particular embodiments, interfaces 61 are radio packet (RP) interfaces supported by Fast Ethernet or ATM OC-3 physical links. In such embodiments, each RP interface 61 may include one or more A10 connections for communicating user traffic and one or more A11 connections for communicating signaling information.

Mobile units 30 may include wireless telephones, wireless interface terminals, wireless personal digital assistants (PDAs), laptop computers, or any other suitable mobile device operable to provide wireless communication in communication system 10. Mobile units 30 are operable to communicate data with base stations 60 over an air interface 32 or any other suitable wireless interface. Air interface 32 may be a radio frequency (RF) interface. Mobile units 30 and serving nodes 50 may communicate data and associated information by in-band and/or out-of-band messaging.

According to one embodiment, air interface 32 is an RF link that is based on established technology, such as IS-95 CDMA, W-CDMA, or CDMA-2000. In a particular embodiment, link 32 is a CDMA link based on a CDMA standard in which data are segmented into frames for wireless transmission from mobile unit 30 to base stations 60, where the frames are reassembled to reconstitute the packets.

Communication system 10 also includes mobile switching centers (MSCs) 70 coupled to base stations 60. MSCs 70 are operable to perform authentication and to set up and disconnect calls for mobile units 30 serviced by base stations 60. MSCs 70 are also operable to provide, in conjunction with base stations 60, switch and soft hand-off functionality for system 10. In this way, data, such as voice, video, audio, text, and/or any other type of data may be sent to mobile units 30 as they move between areas 62 serviced by base stations 60. Accordingly, mobile units 30 may travel throughout a wide geographic area, while maintaining wireless communications.

Each MSC 70 may include a subscriber database 72. Subscriber databases 72 are operable to store service level information, such as service level agreements 74, for mobile units 30 and to provide such information to base stations 60 and/or serving nodes 50 for service management, traffic management, or other appropriate operations. Subscriber databases 72 may also store information relating to mobile units 30 and/or users of mobile units 30, such as names, addresses, account numbers, account types, and any other suitable information.

The service level agreement 74 associated with a particular mobile unit 30 may specify a service level for that mobile unit 30. Data to be communicated from a mobile unit 30 to a base station 60 may be assigned a wireless communication priority level corresponding with the service level associated with that mobile unit 30 and communicated to the base station 60 according to the assigned priority level. The service level associated with each mobile unit 30 may specify one or more wireless communication priority levels for one or more various data services, such as video, text, audio and voice services. For example, the service level for a particular mobile unit 30 may establish a relatively low priority level for communicating data files and a relatively high priority level for communicating voice or video data. In particular embodiments, the wireless communication priority levels are QoS priority levels as defined by a particular wireless communications standard. For example, the wireless communication priority levels may be QoS priority levels as defined by the CDMA2000 standard.

Applications hosted by a mobile unit 30 and/or applications otherwise associated with the mobile unit 30 (such as applications hosted by, a laptop computer connected to the mobile unit 30) may have access to the service level agreement 74, or information regarding the service level agreement 74 (such as the service level or one or more priorities specified by the service level of the mobile unit 30) associated with the mobile unit 30. Thus, as discussed below in greater detail, an application may assign appropriate wireless communication priority levels (such as CDMA2000 QoS levels, for example) to data to be communicated from mobile unit 30 based on relevant service level information regarding mobile unit 30, the type of data (such as voice, text, or video, for example) and/or communication parameters such as required bandwidth and jitter requirements, for example.

Each base station 60 may include a packet control function (PCF) 64 to manage the sending and receiving of data to and/or from mobile units 30. PCFs 64 may include logic encoded in media, microcontrollers, application-specific integrated circuits, and/or any other type of system for manipulating information in a logical manner. In particular embodiments, PCFs 64 may be operable to provide mapping between the wireless communication priority levels and the wireline communication priority levels discussed above. For example, the wireless communication priority level of particular data received from a mobile unit 30 may be mapped to a corresponding wireline communication priority level for communication of the data toward one or more servers 20 via a serving node 50 and/or communications network 40. Each PCF may include one or more mapping tables or any other suitable system to store a set or correlations between wireless communication priority levels and wireline communication priority levels. Thus, communication system 10 may be operable to provide or maintain consistent priority-based forwarding of data between mobile units 30 and servers 20.

Figure 2:
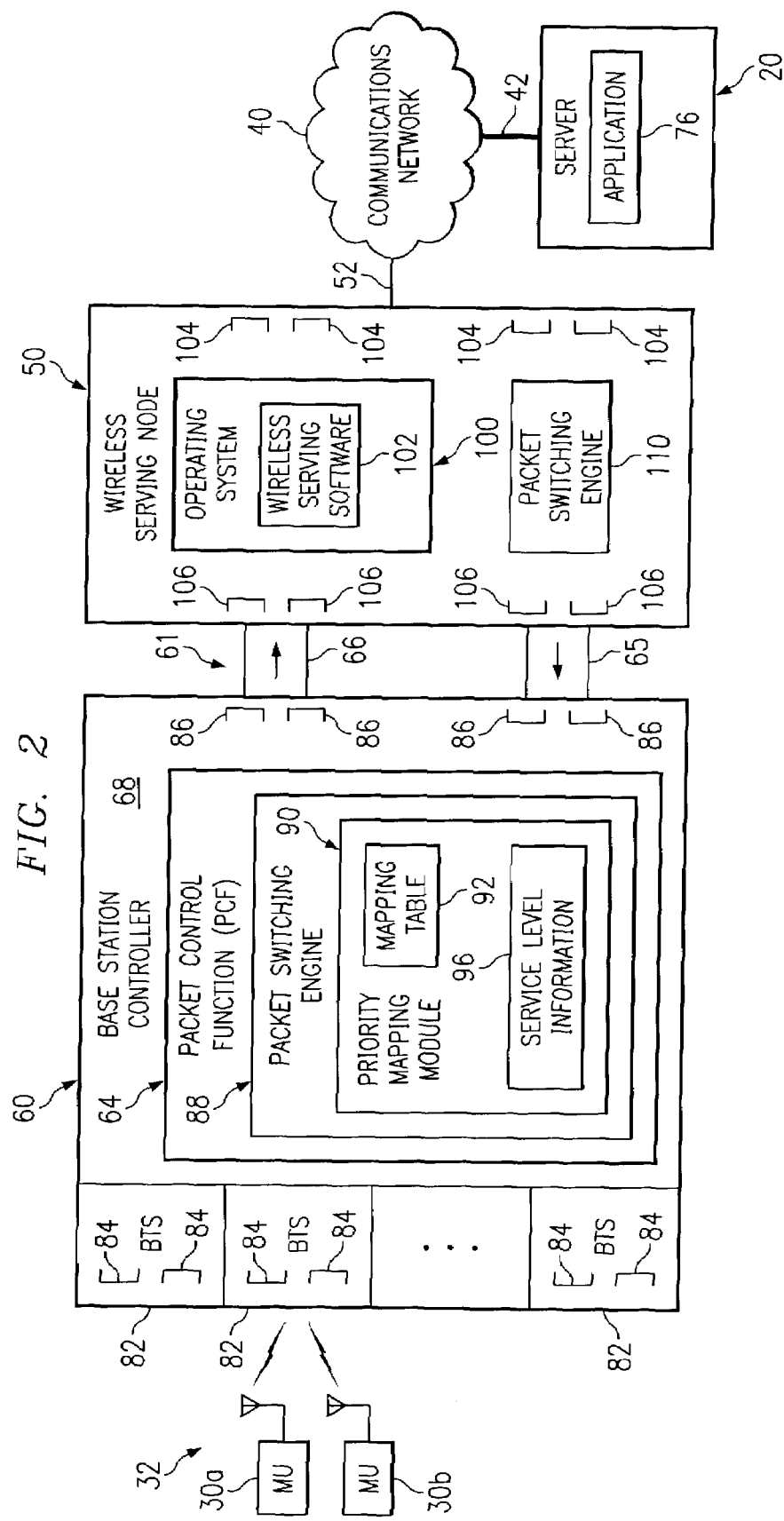
FIG. 2 illustrates portions of the communication system of FIG. 1 used in communicating data between a server and one or more mobile units in accordance with one embodiment of the present invention.

FIG. 2 illustrates portions of communication system 10 used in communicating data between a particular server 20 and one or more particular mobile units 30 in accordance with one embodiment of the present invention. In particular, FIG. 2 illustrates the particular server 20, communications network 40, a particular serving node 50, a particular base station 60 having an associated PCF 64 and a first mobile unit 30a and second mobile 30b within the service area of base station 60.

Server 20 may host or be coupled to one or more applications 76 operable to communicate and/or receive data via communications network 40. Applications 76 may include Internet applications, such as web services applications, e-mail applications, voice-mail applications, and/or multicast multimedia applications, for example. Each application 76 may assign a wireline communication priority level to data to be communicated via communications network 40. An application 76 may assign the wireline communication priority level based various factors such as a service level assigned to the application 76, the relevant server 20 or a user associated with the application 76, and the type of data (such as voice, video, text or voice, for example) being communicated, for example. For example, a particular application 76 having a service level specifying a relatively low wireline communication priority level for communicating data files and a relatively high wireline communication priority level for communicating voice or video data may assign data to be communicated via communications network 40 a wireline communication priority level based on the type of data to be communicated. In particular embodiments, the wireline communication priority levels are QoS priority levels as defined by a particular network communications standard. For example, the wireline communication priority levels may be QoS priority levels as defined by an Internet communications standard, such as DiffServ QoS or class selector priority levels.

It is intended that the term "via" as used throughout this document is to be interpreted broadly to include both direct and indirect routes, as well as routes that include one or more intermediate points or nodes. For example, if data is communicated from server 20 to communications network 40, then to serving node 50, and then to base station 60, it is accurate to say both that the data is received at base station 60 via communications network 40 and that the data is received at base station 60 via serving node 50. Similarly, if data is communicated from a mobile unit 30a over air interface 32 to a base station transceiver 82 and then to base station controller 68, it is accurate to say both that the data is received from mobile station 30a at base station controller 68 via the base station transceiver 82 and that the data is received from mobile station 30a at base station controller 82 via air interface 32.

Serving node 50 includes an operating system 100 operable to manage various operations of serving node 50, such as how to apportion memory, how to manage various tasks, and how to manage the flow of information. In particular embodiments, operating system 100 comprises a Cisco IOS. Operating system 100 is operable to execute wireless serving software 102 to manage the flow of data from communications network 40 to one or more base stations 60.

Serving node 50 also includes one or more buffers, or queues, 104 operable to receive, store and/or sort data communicated to and/or from communications network 40 via interface 52. Similarly, serving node 50 includes one or more buffers, or queues, 106 operable to receive, store and/or sort data communicated to and/or from base station controller 60 via interface 61. Serving node 50 also includes a packet switching engine 110 operable to provide various functions regarding discreet units of data, such as packets or cells, being communicated through serving node 50, such as switching, routing, splitting and/or recombining functions, for example. Packet switching engine 10 may perform such functions based on the wireline communication priority level assigned to various units of data being communicated through serving node 50.

In particular embodiments, packet switching engine 110 may be operable to determine whether to change the wireline communication priority level assigned to particular data based on information received from base station 60. For example, packet switching engine 110 may be operable to determine whether to change the wireline communication priority level assigned to particular data intended for a particular mobile station 30a based on service level information received from base station 60 regarding the mobile station 30a. Packet switching engine 110 may also be operable to perform such changes to the wireline communication priority level assigned to particular data, such as by re-writing one or more bits (such as Class Selector Code Points, for example) specifying the wireline communication priority level assigned to the data.

As discussed above, interface 61 between serving node 50 and base station 60 may be a radio packet (RP) interface, which may at any particular time include one or more A10 connections for communicating user traffic and one or more A11 connections for communicating signaling information. Interface 61 may include zero, one or more inbound A10 connections 66 for transferring data from base station 60 to serving node 50, and one or more inbound A10 connections 65 for transferring data from serving node 50 to base station 60. Inbound and outbound A10 connections 66 and 65 may be dynamically established (or set up) and terminated (or torn down) by serving node 50 and/or base station 60 based on the amount, size, type and/or priority of data to be communicated across interface 61, including the amount, size, type and/or priority of data waiting in queues 86 and/or 106. For example, serving node 50 may determine the number and/or size of inbound and outbound A10 connections 66 and 65 for communicating particular data between serving node 50 and base station 60.

Base station 60 includes a base station controller 68 and one or more base station transceivers 82 which may be distributed such that each base station transceiver 82 is operable to service a particular service area. In particular embodiments, such as in a W-CDMA or CDMA 2000 environment, for example, base station controller 68 may be a Base Station Controller (BSC) and each base station transceiver 82 may be a Base Transceiver Stations (BTS). In other embodiments, such as in a GSM environment, base station controller 68 may be a Radio Network Controllers (RNC) and each base station transceiver 82 may be a Node B base stations.

Each base station transceiver 82 includes one or more buffers, or queues, 84 operable to receive, store and/or sort data communicated to and/or from mobile units 30a and 30b via air interface 32. Similarly, base station 60 includes one or more buffers, or queues, 86 operable to receive, store and/or sort data communicated to and/or from serving node 50 via interface 61. Base station 60 also includes or is associated with packet control function (PCF) 64 operable to manage the communication of data between queues 84 of base station transceivers 82 and queues 86 of base station 60. PCF 64 includes a packet switching engine 88 operable to provide various functions regarding discreet units of data, such as packets or cells, being communicated through base station 60, such as switching, routing, splitting and/or recombining functions, for example. In particular embodiments, packet switching engine 88 may perform such functions based on the wireless communication priority level assigned to various units of data being communicated through base station 60.

Packet switching engine 88 may include a priority mapping module 90 operable to provide mapping between the wireless communication priority levels and the wireline communication priority levels associated with data being communicated through base station 60. For example, priority mapping module 90 may be operable to map a wireless communication priority level of particular data received from mobile unit 30a to a corresponding wireline communication priority level for communication of the data toward server 20 via serving node 50 and communications network 40. Priority mapping module 90 may store a mapping table 92 specifying a set of correlations between wireless communication priority levels and wireline communication priority levels, as discussed below in greater detail. Mapping table 92 may be static or dynamic. For example, mapping table may be updateable over time.

FIG. 3 illustrates an example mobile unit 30a in accordance with an embodiment of the present invention. As discussed above, mobile units 30a may be a wireless telephone, wireless interface terminal, wireless personal digital assistant (PDA), laptop computer, or any other suitable mobile device operable to provide wireless communication in communication system 10. One or more applications 34 may be hosted by, or otherwise associated with, mobile unit 30. For example, one or more applications 34 may be hosted by a laptop computer connected to mobile unit 30a. Each application 34 may be operable to communicate and/or receive data via communications network 40. Applications 34 may include Internet applications, such as web services applications, telephone service applications and/or multimedia applications, for example.

Applications 34 may have access to the service level agreement 74, or service level information 38 regarding the service level agreement 74 (such as one or more wireless communication priority levels specified by the service level of the mobile unit 30) associated with mobile unit 30a. Thus, as discussed below in greater detail, a particular application 34 may assign an appropriate wireless communication priority level (such as a CDMA2000 QoS level, for example) to data to be communicated from mobile unit 30 based on relevant service level information regarding mobile unit 30a, the type of data (such as voice, text, or video, for example) and/or one or more communication parameters such as required bandwidth and jitter requirements, for example.

In particular embodiments, mobile unit 30a and/or one or more applications 34 may also comprise a priority mapping module 36 operable to provide mapping between wireline communication priority levels associated with data being communicated via a wireline network (such as a network similar to communications network 40, for example) and wireless communication priority levels for communicating such data from mobile unit 30a to base station 60 via air interface 32. For example, priority mapping module 36 may be operable to map a wireline communication priority level assigned to particular data received by mobile unit 30a to a corresponding wireless communication priority level for communicating such data to base station 60 via air interface 32. Priority mapping module 90 may store a mapping table (such as mapping table 92 discussed above, for example) specifying a set of correlations between wireline communication priority levels and wireless communication priority levels, as discussed below in greater detail.

As discussed above with reference to FIG. 2, mapping table 92 may specify a set of correlations between wireless communication priority levels associated with data being communicated via air interface 32 and wireline communication priority levels associated with data being communicated via communications network 40. For example, in particular embodiments in which the wireless communication priority levels are CDMA2000 QoS priority levels and the wireline communication priority levels may be QoS priority levels as defined by an Internet communications standard, such as DiffServ QoS or class selector priority levels, mapping table 92 may specify a number of correlations between one or more CDMA2000 QoS priority levels and one or more DiffServ QoS or class selector priority levels.

FIG. 4 illustrates an example mapping table 92 in accordance with one such embodiment of the present invention. In this embodiment, the wireless communication priority levels include sixteen CDMA2000 QoS priority levels according to the PN-4720 standard and the wireline communication priority levels include eight class selector priority levels for forwarding data over differentiated services (DiffServ) interfaces according to the RFC2474 standard. The CDMA2000 QoS priority level for data packets being communicated via air interface 32 is specified by a four-bit field in a packet header, ranging from 0000 (lowest priority) to 1111 (highest priority), while the class selector priority level for data packets being communicated via communications network 40 and wireless serving node 50 is specified by a three-bit field in a packet header, ranging from 000 (lowest priority) to 111 (highest priority). The three bits identifying the class selector priority level may be referred to as the Class Selector Code Points (CSCP).

In particular embodiments in which communications network 40 comprises the Internet or other network including differentiated services interfaces, network data is forwarded from hop-to-hop, or node-to-node, according to the class selector priority level (000, 001, 010, etc.) associated with the particular data. Such treatment of data may be described as the Diffserv per-hop behavior (PHB) of the data, which may be specified by DiffServ PHB labels associated with various class selector priority levels. The DiffServ PHB levels include Best Efforts, Assured Forwarding, and Expedited Forwarding (EF) levels. For example, under the RFC2474 standard, DiffServ PHB levels include Best Efforts, AF1, AF2, AF3, EF, and reserved levels.

As shown in FIG. 4, each class selector priority level (000, 001, 010, etc.), with the possible exception of particular reserved priority levels, may be correlated with two CDMA2000 QoS priority levels. In some embodiments, the two CDMA2000 QoS priority levels correlated with a particular class selector priority level may be distinguished such that one of the two CDMA2000 QoS priority levels has a higher priority (such as a lower drop precedence, for example) than the other CDMA2000 QoS priority level. For example, in the mapping table 92 shown in FIG. 4, although CDMA2000 QoS priority levels 0010 and 0011 are both mapped to class selector 001, CDMA2000 QoS priority level 0011 may have a higher priority than CDMA2000 QoS priority level 0010.

In addition, a unique DiffServ PHB level may be assigned to each of the two CDMA2000 QoS priority levels correlated with a particular class selector priority level. For example, as shown in FIG. 4, each Assured Forwarding level, AF1, AF2, and AF3, may be divided into sub-levels of priority, which may each be designated as AF1x, AF2x and AF3x, where "x" for each sub-level is a different number. Thus, x may be 1, 2 or 3 such that AF1, AF2, and AF3 may be divided into AF11, AF12 and AF13; AF21, AF22 and AF23; and AF31, AF32 and AF33, respectively, where AF11 has a higher priority than AF12 which has a higher priority than AF13, AF21 has a higher priority than AF22 which has a higher priority than AF23, and AF31 has a higher priority than AF32 which has a higher priority than AF33. This may allow a wireless service provider to offer users a choice of "standard" wireless QoS priority (such as xxx0) or "enhanced" wireless QoS priority (such as xxx1) that can be matched with corresponding Diffserv classes; for example, AFy3 and AFy2 may be matched with xxx0 and xxx1, respectively. Alternatively, in some embodiments, the two CDMA2000 QoS priority levels correlated with a particular class selector priority level may be afforded the same DiffServ PHB level, with no difference in priority between them. For example, a wireless user who subscribes to a standard minimum QoS priority 0000 may get "best effort" service while another wireless user who subscribes to an enhanced minimum QoS priority gets "better-than-best-effort" (in other words, a higher priority service) for the communication of data at least over air interface 32, with the same "best effort" service provided via network 40.

FIG. 5 illustrates an example data packet 120 communicated from application 76 hosted by server 20. Packet 120 includes a header byte 122 which includes three bits comprising three Class Selector Code Points (CSCP) 124, three middle bits 126, and two end bits 128. In particular embodiments, one or more middle bits 126 may be used to specify the sub-level of a traditional DiffServ PHB level. For example, in the embodiment shown in FIG. 4, one or more middle bits 126 may be used to specify the "x" in AF1x, AF2x and AF3x. It should be understood that in particular embodiments, none, some, or all switches, routers and/or other type of communication nodes may be operable to use such middle bits 126 appropriately for priority-based forwarding purposes. For example, in one embodiment, some routers may not be operable to treat two packets 120 having the same Class Selector Code Points (CSCP) 124 but one or more different middle bits 126 (to specify different levels of priority between the two packets 120) as having different priority levels.

Mapping table 92 may include any other suitable mapping, or correlations, of wireless communication priority levels with wireline communication priority levels within the scope of the present invention. For example, any number of wireline communication priority levels may be correlated with any particular wireless communication priority level and vice-versa, and the wireline communication priority levels may be correlated with the wireless communication priority levels in any desired order, such as in sequential numerical order (such as shown in FIG. 4) or in non-sequential numerical order.

Figure 6:
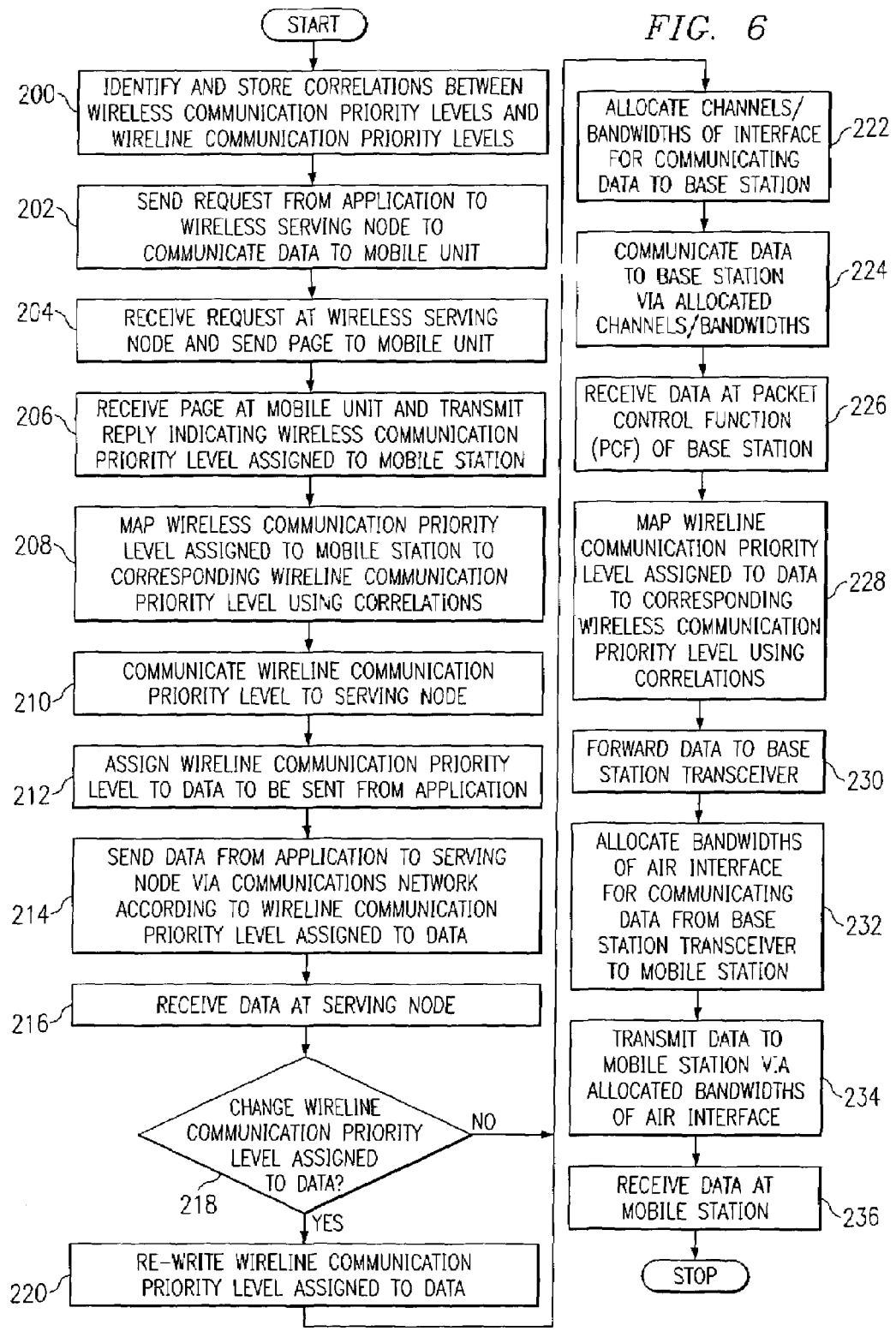
FIG. 6 illustrates a method for consistent priority-based forwarding of data from a server to a mobile unit in accordance with an embodiment of the present invention.

FIG. 6 illustrates a method for consistent priority-based forwarding of data from server 20 to one or more mobile units 30 in accordance with an embodiment of the present invention. At step 200, a set of correlations between a set of wireless communication priority levels associated with data being communicated via an air interface 32 and a set of wireline communication priority levels associated with data being communicated via a communications network 40 is identified and stored at base station 60. Such correlations may be specified by mapping table 92 stored at base station 60. In a particular embodiment, the wireless communication priority levels include sixteen CDMA2000 QoS priority levels according to the PN-4720 standard and the wireline communication priority levels include eight class selector priority levels for forwarding data over DiffServ interfaces according to the RFC2474 standard.

At step 202, application 76 hosted by server 20 transmits a request toward serving node 50 to communicate data to mobile unit 30a. For example, application 76 may transmit a request to make an unsolicited communication of data to mobile unit 30a, such as a weather update, for example.

At step 204, serving node receives the request from application 76 and sends a page to mobile unit 30a via base station 60. Because the location of 30a may be unknown, the page may be sent from one or more base station transceivers 82 associated with one or more base stations 60.

At step 206, mobile unit 30a receives the page from a particular base station transceiver 82 and transmits a reply to the base station transceiver 82, which is forwarded to the relevant PCF 64. The reply may indicate the location of mobile unit 30a and service level information 38 regarding mobile unit 30a, such as one or more wireless communication priority levels assigned to the mobile station. For example, such service level information 38 may specify that mobile unit 30a is entitled to a particular, relatively high, wireless QoS priority (such as a CDMA2000 QoS priority of 0111, for example) for voice communications and a particular, relatively low, wireless QoS priority (such as a CDMA2000 QoS priority of 0001, for example) for email communications. The following discussion describes an example scenario in which a particular wireline communication priority level associated with mobile unit 30a is specified in the reply communicated by mobile unit 30a.

At step 208, the wireless communication priority level associated with mobile unit 30a is translated, or mapped, to a corresponding wireline communication priority level. In particular embodiments, priority mapping module 90 associated with packet switching engine 86 of PCF 64 performs such translation, or mapping, based on mapping table 92 to determine the corresponding wireline communication priority level. For example, in an embodiment including the example mapping table 92 shown in FIG. 4, and in which the wireless communication priority level associated with mobile unit 30*a* is 0100, priority mapping module 90 may use mapping table 92 to determine a corresponding wireline communication priority level of 010.

At step 210, the corresponding wireline communication priority level determined at step 208 is communicated to serving node 50. In particular embodiments, the corresponding wireline communication priority level may be communicated to serving node 50 via interface 61.

At step 214, application 76 assigns a wireline communication priority level to the data intended for mobile unit 30*a*. Application 76 may assign a wireline communication priority level to the data based on various factors, such as the size or type of data (such as voice, text or video data, for example) and/or a service level associated with application 76. For example, in a Diffserv environment, application 76 may assign a high DiffServ PHB priority (such as EF, for example) for voice communications and a relatively low DiffServ PHB priority (such as AF11, for example) for email communications. As discussed above with reference to FIG. 5, the data may comprise data packets having headers that include one or more bits (such as Class Selector Code Points, for example) specifying the wireline communication priority level assigned to the data.

At step 214, application 76 transmits the data intended for mobile unit 30*a* to serving node 50 via communications network 40. For example, application 76 may transmits data associated with a weather update to mobile unit 30*a*. The data is communicated via communications network 40 according to the wireline communication priority level assigned to the data at step 214.

At step 216, the data is received by serving node 50. At step 218, it is determined whether to change the wireline communication priority level assigned to the data by application 76 based on the wireline communication priority level determined at step 208 (in other words, the wireline communication priority level determined to correspond with the wireless communication priority level associated with mobile unit 30*a*). In one particular embodiment, it may be determined to change the wireline communication priority level assigned to the data to the wireline communication priority level determined at step 208 to match the wireline communication priority level determined at step 208. In particular embodiments, such determinations are made by packet switching engine 110. For example, if the wireline communication priority level assigned to the data by application 76 is the DiffServ PHB level of AF3 and the wireline communication priority level determined at step 208 is the DiffServ PHB level of AF1, packet switching engine 110 may decide to reduce the wireline communication priority level assigned to the data from AF3 to AF1.

If it is determined to change the wireline communication priority level assigned to the data, such change may be made at step 220. In particular embodiments, packet switching engine 110 may execute such a change by re-writing at least one of the one or more bits (such as Class Selector Code Points, for example) specifying the wireline communication priority level assigned to the data. Thus, according to the example discussed above, if packet switching engine 110 may decides at step 218 to reduce the wireline communication priority level assigned to the data from AF3 to AF1, packet switching engine 110 may re-write the Class Selector Code Points from 011 (corresponding to the DiffServ PHB of AF3) to 001 (corresponding to the DiffServ PHB of AF1). Alternatively, if it is determined not to change the wireline communication priority level assigned to the data, the method proceeds to step 222.

At step 222, one or more channels, or bandwidths, of interface 61 for communicating the data from serving node 50 to base station controller 68 may be established or allocated based on the wireline communication priority level assigned to the data. The term "channel" as used throughout this document includes any physical or logical portion of an interface between two entities, such as logical or physical channels, connections, bandwidths, cables or fibers, for example. For example, one or more inbound A10 connections 65 may be established for communicating the data from serving node 50 to base station 60. Establishing or allocating such channels or bandwidths may include selecting the type, number and/or size of channels or bandwidths based on bandwidth or other resources required for communicating the data at the wireline communication priority level assigned to the data. In particular embodiments, the one or more channels or bandwidths may be established or allocated by serving node 50. At step 224, the data may be communicated to base station 60 via the one or more allocated channels, or bandwidths, of interface 61.

At step 226, the data is received by PCF 64 associated with base station 60. At step 228, the wireline communication priority level assigned to the data may be translated, or mapped, to a corresponding wireless communication priority level. In particular embodiments, priority mapping module 90 associated with packet switching engine 86 of PCF 64 performs such translation, or mapping, based on mapping table 92 to determine the corresponding wireless communication priority level. For example, in an embodiment including the example mapping table 92 shown in FIG. 4, and in which the wireline communication priority level assigned to the data is the DiffServ PHB of AF1 (corresponding with Class Selector Code Points 001), priority mapping module 90 may use mapping table 92 to determine a corresponding wireline communication priority level of 0010 or 0011.

In particular embodiments, where a particular wireline communication priority level may correspond with more than one wireless communication priority level, such as the example situation described above in which each DiffServ PHB corresponds with two CDMA2000 QoS priority levels, priority mapping module 90 may select one of the wireless communication priority levels based on service level information regarding mobile unit 30*a*, such as one or more wireless communication priority levels assigned to the mobile station, for example. For example, the service level information regarding mobile unit 30*a* may indicate whether mobile unit 30*a* is entitled to a "standard" or "enhanced" level of service. Thus, in the example situation discussed above, priority mapping module 90 may select between 0010 and 0011 as the appropriate wireless communication priority level to assigned the data.

At step 230, the data may be forwarded to an appropriate queue 84 of an appropriate base station transceiver 82 based on the location of mobile unit 30*a* and the wireless communication priority level assigned to the data at step 228. At step 232, one or more bandwidths of air interface 32 may be allocated for communicating the data from the appropriate base station transceiver 82 to mobile unit 30*a* based on the wireless communication priority level assigned to the data at step 228. At step 234, the data may be transmitted toward mobile unit 30*a* via the one or more allocated bandwidths of air interface 32. Mobile unit 30*a* may receive the data via the one or more allocated bandwidths at step 236.

FIG. 7 illustrates a method for consistent priority-based forwarding of data from a mobile unit 30*a* to a server 20 in accordance with an embodiment of the present invention. At step 300, a set of correlations between a set of wireless communication priority levels associated with data being communicated via an air interface 32 and a set of wireline communication priority levels associated with data being communicated via a communications network 40 is generated and stored at base station 60. Such correlations may be specified by mapping table 92 stored at base station 60. In a particular embodiment, the wireless communication priority levels include sixteen CDMA2000 QoS priority levels according to the PN-4720 standard and the wireline communication priority levels include eight class selector priority levels for forwarding data over Diffserv interfaces according to the RFC2474 standard.

At step 302, application 34 determines a wireless communication priority level for data to be communicated to a base station transceiver 82 via air interface 32. For example, application 34 may determine the wireless communication priority level for the data based on relevant service level information regarding mobile unit 30a, the type of data (such as voice, text, or video, for example) and/or communication parameters such as required bandwidth and jitter requirements, for example. As another example, if the data has an assigned wireline communications priority level (such as a Diffserv PHB level), application 34 may determine the wireless communication priority level for the data by mapping the wireline communication priority level assigned to the data with a corresponding wireless communication priority level. In particular embodiments, such mapping may be performed by application 34 and/or mobile unit 30a based on mapping information such as a mapping table (such as mapping table 92, for example).

At step 304, mobile unit 30a communicates a request to base station transceiver 82 for sufficient bandwidth to communicate the data at the wireless communication priority level determined at step 302. At step 306, the request is forwarded to PCF 64 of base station 80.

At step 308, the wireless communication priority level determined for the data (in other words, the wireless communication priority level determined at step 302) is translated, or mapped, to a corresponding wireline communication priority level. In particular embodiments, priority mapping module 90 associated with packet switching engine 88 of PCF 64 performs such translation, or mapping, based on mapping table 92.

At step 310, the corresponding wireline communication priority level determined at step 308 is communicated to serving node 50. In particular embodiments, the corresponding wireline communication priority level may be communicated to serving node 50 via interface 61.

At step 312, one or more channels, or bandwidths, of interface 61 for receiving the data to be communicated from mobile unit 30a may be established or allocated based on the wireline communication priority level determined at step 308. For example, one or more outbound A10 connections 66 may be established for receiving the data to be communicated from mobile unit 30a. Establishing or allocating such channels or bandwidths may include selecting the type, number and/or size of channels or bandwidths based on bandwidth or other resources required for communicating the data at the wireline communication priority level assigned to the data. In particular embodiments, the one or more channels, or bandwidths, may be established or allocated by serving node 50.

At step 314, one or more bandwidths of air interface 32 may be allocated for receiving the data the data to be communicated from mobile unit 30a based on the wireless communication priority level determined by application 34 at step 302. At step 316, the data is transmitted from mobile unit 30a to base station transceiver 82 via the one or more allocated bandwidths of air interface 32. At step 318, the data is forwarded to PCF 64.

At step 320, the wireless communication priority level assigned to the data is translated, or mapped, to a corresponding wireline communication priority level. In particular embodiments, priority mapping module 90 associated with packet switching engine 88 of PCF 64 performs such translation, or mapping, based on mapping table 92.

At step 322, the data is transmitted from base station 60 to serving node 50 via the one or more channels or bandwidths of interface 61 established or allocated at step 312. At step 324, the data is transmitted from serving node 50 to server 20 via communications network 40 based on the wireline communication priority level determined at step 320.

Although an embodiment of the invention and its advantages are described in detail, a person skilled in the art could make various alternations, additions, and omissions without departing from the spirit and scope of the present invention as defined by the appended claims.

What is claimed is:

1. A method for consistent forwarding of data across wireless and wireline networks, comprising:
storing a plurality of correlations between a set of wireline communication priority levels and a set of wireless communication priority levels;
receiving from a mobile station an indication of a wireless communication priority level assigned to the mobile station;
receiving data from a wireless serving node via a wireline communications network, the data received according to a wireline communication priority level assigned to the data from the set of wireline communication priority levels based at least in part on the wireless communication priority level assigned to the mobile station and one or more of the plurality of correlations;
determining from the set of wireless communication priority levels a wireless communication priority level for the data based at least in part on the wireline communication priority level associated with the data and one or more of the plurality of correlations; and
transmitting the data to the mobile station according to the wireless communication priority level determined for the data.

2. The method of claim 1, wherein the data is received according to a wireline communication priority level assigned to the data by the application.

3. The method of claim 1, wherein:
receiving data from an application via a wireline communications network comprises receiving the data from a wireless serving node; and
receiving data from an application via a wireline communications network comprises receiving the data from the wireless serving node according to a wireline communication priority level assigned to the data by the wireless serving node based at least in part on priority level information regarding the mobile station.

4. The method of claim 3, further comprising:
communicating a page signal to the mobile station regarding the data;
receiving from the mobile station a reply to the page, the reply indicating a wireless communication priority level assigned to the mobile station;
determining from the set of wireline communication priority levels a wireline communication priority level for receiving the data from the wireless serving node based at least in part on the wireless communication priority level assigned to the mobile station and one or more of the plurality of correlations;

communicating the determined wireline communication priority level to the wireless serving node; and wherein receiving the data from the wireless serving node according to a wireline communication priority level assigned to the data by the wireless serving node based at least in part on priority level information regarding the mobile station comprises receiving the data from the wireless serving node according to a wireline communication priority level assigned to the data by the wireless serving node based on the determined wireline communication priority level.

5. The method of claim 1, wherein:

the mobile station has an assigned wireless communication priority level for each of one or more classes of wireless communications; and determining a wireless communication priority level for the data comprises determining a wireless communication priority level based at least in part on the wireline communication priority level associated with the data, one or more of the plurality of correlations, and a particular one of the wireless communication priority levels assigned to the mobile station.

6. The method of claim 5, wherein determining a wireless communication priority level for the data comprises:

determining from the set of wireless communication priority levels a provisional wireless communication priority level based on the wireline communication priority level associated with the data and one or more of the plurality of correlations; and determining a wireless communication priority level for the data based on the provisional wireless communication priority level and the particular wireless communication priority level assigned to the mobile station.

7. The method of claim 1, wherein:

the set of wireline communication priority levels comprises eight wireline communication priority levels;

the set of wireless communication priority levels comprises sixteen wireless communication priority levels;

the plurality of correlations comprises at least one correlation between one of the eight wireline communication priority levels and two of the sixteen wireless communication priority levels.

8. The method of claim 7, wherein for a particular two of the sixteen wireless communication priority levels correlated with one of the eight wireline communication priority levels, one of the two wireless communication priority levels is assigned a lower drop precedence than the other.

9. The method of claim 1, wherein transmitting the data to the mobile station according to the wireless communication priority level determined for the data comprises:

allocating one or more bandwidths associated with the air interface for communicating the data based on the wireless communication priority level determined for the data; and transmitting the data to the mobile station via the one or more allocated bandwidths associated with the air interface.

10. A method for consistent forwarding of data across wireless and wireline networks, comprising:

receiving data from an application via a wireline communications network, wherein:

the data is received according to a wireline communication priority level assigned to the data from the set of wireline communication priority levels; and the data is intended for a mobile station having a mobile station wireless priority level from a set of wireless communication priority levels;

receiving from a packet mapping module a mobile station wireline priority level determined from a set of wireline communication priority levels based on the mobile station wireless priority level and one or more correlations between the set of wireline communication priority levels and a set of wireless communication priority levels;

determining whether to change the wireline communication priority level assigned to the data based on the mobile station wireline priority level;

changing the wireline communication priority level assigned to the data; and transmitting the data toward the mobile station according to the wireline communication priority level assigned to the data.

11. The method of claim 10, wherein transmitting the data toward the mobile station according to the wireline communication priority level assigned to the data comprises:

allocating, based at least in part on the wireline communication priority level assigned to the data, one or more channels of a communications link for communicating the data; and transmitting the data toward the mobile station via one or more allocated channels of the communications link.

12. The method of claim 10, wherein:

determining whether to change the wireline communication priority level assigned to the data comprises determining whether the mobile station wireline priority level is lower than the wireline communication priority level assigned to the data; and changing the wireline communication priority level assigned to the data comprises changing the wireline communication priority level assigned to the data to the mobile station wireline priority level if the mobile station wireline priority level is lower than the wireline communication priority level assigned to the data.

13. The method of claim 10, wherein:

the data comprises one or more bits specifying the wireline communication priority level assigned to the data; and changing the wireline communication priority level assigned to the data comprises re-writing at least one of the one or more bits specifying the wireline communication priority level assigned to the data.

14. A set of logic for consistent forwarding of data, the logic encoded in media and operable to:

store a plurality of correlations between a set of wireline communication priority levels and a set of wireless communication priority levels;

receive from a mobile station an indication of a wireless communication priority level assigned to the mobile station;

receive data from a wireless serving node via a wireline communications network, the data received according to a wireline communication priority level assigned to the data from the set of wireline communication priority levels based at least in part on the wireless communication priority level assigned to the mobile station and one or more of the plurality of correlations;

determine from the set of wireless communication priority levels a wireless communication priority level for the data based at least in part on the wireline communication priority level associated with the data and one or more of the plurality of correlations; and transmit the data to the mobile station according to the wireless communication priority level determined for the data.

15. The logic of claim 14, wherein the data is received according to a wireline communication priority level assigned to the data by the application.

16. The logic of claim 14, wherein:

receiving data from an application via a wireline communications network comprises receiving the data from a wireless serving node; and receiving data from an application via a wireline communications network comprises receiving the data from the wireless serving node according to a wireline communication priority level assigned to the data by the wireless serving node based at least in part on priority level information regarding the mobile station.

17. The logic of claim 16, wherein the logic is further operable to:

communicate a page signal to the mobile station regarding the data;

receive from the mobile station a reply to the page, the reply indicating a wireless communication priority level assigned to the mobile station;

determine from the set of wireline communication priority levels a wireline communication priority level for receiving the data from the wireless serving node based at least in part on the wireless communication priority level assigned to the mobile station and one or more of the plurality of correlations; and communicate the determined wireline communication priority level to the wireless serving node; and wherein receiving the data from the wireless serving node according to a wireline communication priority level assigned to the data by the wireless serving node based at least in part on priority level information regarding the mobile station comprises receiving the data from the wireless serving node according to a wireline communication priority level assigned to the data by the wireless serving node based on the determined wireline communication priority level.

18. The logic of claim 14, wherein:

the mobile station has an assigned wireless communication priority level for each of one or more classes of wireless communications; and determining a wireless communication priority level for the data comprises determining a wireless communication priority level based at least in part on the wireline communication priority level associated with the data, one or more of the plurality of correlations, and a particular one of the wireless communication priority levels assigned to the mobile station.

19. The logic of claim 18, wherein determining a wireless communication priority level for the data comprises:

determining from the set of wireless communication priority levels a provisional wireless communication priority level based on the wireline communication priority level associated with the data and one or more of the plurality of correlations; and determining a wireless communication priority level for the data based on the provisional wireless communication priority level and the particular wireless communication priority level assigned to the mobile station.

20. The logic of claim 14, wherein transmitting the data to the mobile station according to the wireless communication priority level determined for the data comprises:

allocating one or more bandwidths associated with the air interface for communicating the data based on the wireless communication priority level determined for the data; and transmitting the data to the mobile station via the one or more allocated bandwidths associated with the air interface.

21. A system for consistent forwarding of data across wireless and wireline networks, comprising a base station node operable to:

store a plurality of correlations between a set of wireline communication priority levels and a set of wireless communication priority levels;

receive from a mobile station an indication of a wireless communication priority level assigned to the mobile station;

receive data from a wireless serving node via a wireline communications network, the data received according to a wireline communication priority level assigned to the data from the set of wireline communication priority levels based at least in part on the wireless communication priority level assigned to the mobile station and one or more of the plurality of correlations;

determine from the set of wireless communication priority levels a wireless communication priority level for the data based at least in part on the wireline communication priority level associated with the data and one or more of the plurality of correlations; and transmit the data to the mobile station according to the wireless communication priority level determined for the data.

22. The system of claim 21, wherein the base station node is operable to receive the data from the application via the wireline communications network according to a wireline communication priority level assigned to the data by the application.

23. The system of claim 21, wherein the base station node is operable to receive the data from a wireless serving node coupled to the base station node according to a wireline communication priority level assigned to the data by the wireless serving node based on priority information regarding the mobile station.

24. The system of claim 23, wherein the base station node is further operable to:

communicate a page signal to the mobile station regarding the data;

receive from the mobile station a reply to the page, the reply indicating a wireless communication priority level assigned to the mobile station;

determine from the set of wireline communication priority levels a wireline communication priority level for receiving the data from the wireless serving node based at least in part on the wireless communication priority level assigned to the mobile station and one or more of the plurality of correlations; and communicate the determined wireline communication priority level to the wireless serving node; and wherein the base station node is operable to receive the data from the wireless serving node according to a wireline communication priority level assigned to the data by the wireless serving node based on the determined wireline communication priority level.

25. The system of claim 21, wherein:
the mobile station has an assigned wireless communication priority level for each of one or more classes of wireless communications; and
the base station node is operable to determine a wireless communication priority level for the data by determining a wireless communication priority level based at least in part on the wireline communication priority level associated with the data, one or more of the plurality of correlations, and a particular one of the wireless communication priority levels assigned to the mobile station.

26. The system of claim 25, wherein the base station node is operable to determine a wireless communication priority level for the data by:
determining from the set of wireless communication priority levels a provisional wireless communication priority level based on the wireline communication priority level associated with the data and one or more of the plurality of correlations; and
determining a wireless communication priority level for the data based on the provisional wireless communication priority level and the particular wireless communication priority level assigned to the mobile station.

27. The system of claim 21, wherein the base station node is operable to transmit the data to the mobile station according to the wireless communication priority level determined for the data by:
allocating one or more bandwidths associated with the air interface for communicating the data based on the wireless communication priority level determined for the data; and
transmitting the data to the mobile station via the one or more allocated bandwidths associated with the air interface.

28. A method for consistent forwarding of data across wireless and wireline networks, comprising:
storing a plurality of correlations between a set of wireline communication priority levels and a set of wireless communication priority levels;
receiving a communication request from a mobile station for a communication session for communicating data, the request indicating a wireless communication priority level assigned to the data from the set of wireless communication priority levels;
receiving data from the mobile station via an air interface, the data received via the air interface according to the wireless communication priority level assigned to the data;
determining from the set of wireline communication priority levels a wireline communication priority level for the data based at least in part on the wireless communication priority level assigned to the data as indicated by the communication request and one or more of the plurality of correlations; and
transmitting the data toward a communications network according to the wireline communication priority level determined for the data.

29. The method of claim 28, wherein the data is received according to a wireless communication priority level assigned to the data by an application associated with the mobile station.

30. The method of claim 28, wherein:
the set of wireline communication priority levels comprises eight wireline communication priority levels;
the set of wireless communication priority levels comprises sixteen wireless communication priority levels;
the plurality of correlations comprises at least one correlation between one of the eight wireline communication priority levels and two of the sixteen wireless communication priority levels.

31. The method of claim 30, wherein within a particular correlation between one of the eight wireline communication priority levels and two of the sixteen wireless communication priority levels, one of the two wireless communication priority levels is assigned a lower drop precedence than the other.

32. The method of claim 28, wherein transmitting the data toward a communications network according to the wireline communication priority level determined for the data comprises:
allocating, based at least in part on the wireline communication priority level determined for the data, one or more channels associated with a communication link for communicating the data; and
transmitting the data toward the communications network via the one or more allocated channels associated with the communication link.

33. The method of claim 28, further comprising communicating the wireline communication priority level determined for the data to a wireless serving node;
wherein receiving data from a mobile station via an air interface comprises receiving the data at a base station node coupled to the wireless serving node by a communications link; and
wherein transmitting the data toward a communications network according to the wireline communication priority level determined for the data comprises transmitting the data toward the wireless serving node via the communications link according to the wireline communication priority level determined for the data.

34. The method of claim 33, wherein transmitting the data to the wireless serving node via the communications link according to the wireline communication priority level determined for the data comprises transmitting the data toward the wireless serving node via one or more channels of the communications link allocated for communication of the data.

35. A set of logic for consistent forwarding of data across wireless and wireline networks, the logic encoded in media and operable to:
store a plurality of correlations between a set of wireline communication priority levels and a set of wireless communication priority levels;
receive a communication request from a mobile station for a communication session for communicating data, the request indicating a wireless communication priority level assigned to the data from the set of wireless communication priority levels;
receive data from the mobile station via an air interface, the data received via the air interface according to the wireless communication priority level assigned to the data;
determine from the set of wireline communication priority levels a wireline communication priority level for the data based at least in part on the wireless communication priority level assigned to the data as indicated by the communication request and one or more of the plurality of correlations; and
transmit the data toward a communications network according to the wireline communication priority level determined for the data.

36. The logic of claim 35, wherein the data is received according to a wireless communication priority level assigned to the data by an application associated with the mobile station.

37. The logic of claim 35, wherein:
the set of wireline communication priority levels comprises eight wireline communication priority levels;
the set of wireless communication priority levels comprises sixteen wireless communication priority levels;
the plurality of correlations comprises at least one correlation between one of the eight wireline communication priority levels and two of the sixteen wireless communication priority levels.

38. The logic of claim 37, wherein within a particular correlation between one of the eight wireline communication priority levels and two of the sixteen wireless communication priority levels, one of the two wireless communication priority levels is assigned a lower drop precedence than the other.

39. The logic of claim 35, wherein transmitting the data toward a communications network according to the wireline communication priority level determined for the data comprises:
allocating, based at least in part on the wireline communication priority level determined for the data, one or more channels associated with a communication link for communicating the data; and
transmitting the data toward the communications network via the one or more allocated channels associated with the communication link.

40. The logic of claim 35, further operable to communicate the wireline communication priority level determined for the data to a wireless serving node;
wherein receiving data from a mobile station via an air interface comprises receiving the data at a base station node coupled to the wireless serving node by a communications link; and
wherein transmitting the data toward a communications network according to the wireline communication priority level determined for the data comprises transmitting the data toward the wireless serving node via the communications link according to the wireline communication priority level determined for the data.

41. The logic of claim 40, wherein transmitting the data to the wireless serving node via the communications link according to the wireline communication priority level determined for the data comprises transmitting the data toward the wireless serving node via one or more channels of the communications link allocated for communication of the data.

42. A system for consistent forwarding of data across wireless and wireline networks, comprising a base station node operable to:
store a plurality of correlations between a set of wireline communication priority levels and a set of wireless communication priority levels;
receive a communication request from a mobile station for a communication session for communicating data, the request indicating a wireless communication priority level assigned to the data from the set of wireless communication priority levels;
receive data from the mobile station via an air interface, the data received via the air interface according to the wireless communication priority level assigned to the data;
determine from the set of wireline communication priority levels a wireline communication priority level for the data based at least in part on the wireless communication priority level assigned to the data as indicated by the communication request and one or more of the plurality of correlations; and
transmit the data toward a communications network according to the wireline communication priority level determined for the data.

43. The system of claim 42, wherein the base station node is operable receive the data according to a wireless communication priority level assigned to the data by an application associated with the mobile station.

44. The system of claim 42, wherein:
the set of wireline communication priority levels comprises eight wireline communication priority levels;
the set of wireless communication priority levels comprises sixteen wireless communication priority levels;
the plurality of correlations comprises at least one correlation between one of the eight wireline communication priority levels and two of the sixteen wireless communication priority levels.

45. The system of claim 44, wherein within a particular correlation between one of the eight wireline communication priority levels and two of the sixteen wireless communication priority levels, one of the two wireless communication priority levels is assigned a lower drop precedence than the other.

46. The system of claim 42, wherein the base station node is operable to transmit the data toward a communications network according to the wireline communication priority level determined for the data by:
allocating, based at least in part on the wireline communication priority level determined for the data, one or more channels associated with a communication link for communicating the data; and
transmitting the data toward the communications network via the one or more allocated channels associated with the communication link.

47. The system of claim 42, wherein the base station node is further operable to communicate the wireline communication priority level determined for the data to a wireless serving node coupled to the base station node by a communications link;
wherein receiving data from a mobile station via an air interface comprises receiving the data at the base station node; and
wherein transmitting the data toward a communications network according to the wireline communication priority level determined for the data comprises transmitting the data toward the wireless serving node via the communications link according to the wireline communication priority level determined for the data.

48. The system of claim 47, wherein the base station node is further operable to transmit the data to the wireless serving node via the communications link according to the wireline communication priority level determined for the data by transmitting the data to the wireless serving node via one or more channels of the communications link allocated for communication of the data.

49. A system for consistent forwarding of data across wireless and wireline networks, comprising:
means for storing a plurality of correlations between a set of wireline communication priority levels and a set of wireless communication priority levels;
means for receiving from a mobile station an indication of a wireless communication priority level assigned to the mobile station;

means for receiving data from a wireless serving node via a wireline communications network, the data received according to a wireline communication priority level assigned to the data from the set of wireline communication priority levels based at least in part on the wireless communication priority level assigned to the mobile station and one or more of the plurality of correlations;

means for determining from the set of wireless communication priority levels a wireless communication priority level for the data based at least in part on the wireline communication priority level associated with the data and one or more of the plurality of correlations; and means for transmitting the data to the mobile station according to the wireless communication priority level determined for the data.

50. A system for consistent forwarding of data across wireless and wireline networks, comprising:

means for storing a plurality of correlations between a set of wireline communication priority levels and a set of wireless communication priority levels;

means for receiving a communication request from a mobile station for a communication session for communicating data, the request indicating a wireless communication priority level assigned to the data from the set of wireless communication priority levels;

means for receiving data from the mobile station via an air interface, the data received via the air interface according to the wireless communication priority level assigned to the data;

means for determining from the set of wireline communication priority levels a wireline communication priority level for the data based at least in part on the wireless communication priority level assigned to the data as indicated by the communication request and one or more of the plurality of correlations; and means for transmitting the data toward a communications network according to the wireline communication priority level determined for the data.

51. A method for consistent forwarding of data across wireless and wireline networks, comprising:

storing a plurality of correlations between a set of wireline communication priority levels and a set of wireless communication priority levels, wherein:
  the set of wireline communication priority levels comprises eight wireline communication priority levels;
  the set of wireless communication priority levels comprises sixteen wireless communication priority levels;
  the plurality of correlations comprises at least one correlation between one of the eight wireline communication priority levels and two of the sixteen wireless communication priority levels; and
  for a particular two of the sixteen wireless communication priority levels correlated with one of the eight wireline communication priority levels, one of the two wireless communication priority levels is assigned a lower drop precedence than the other;

communicating a page signal to a mobile station regarding data to be communicated from an application to the mobile station;

receiving from the mobile station a reply to the page, the reply indicating a wireless communication priority level assigned to the mobile station from the set of wireless communication priority levels;

determining from the set of wireline communication priority levels a wireline communication priority level for receiving the data from the wireless serving node based at least in part on the wireless communication priority level assigned to the mobile station and one or more of the plurality of correlations; and receiving the data from the wireless serving node according to the determined wireline communication priority level.

determining from the set of wireless communication priority levels a wireless communication priority level for the data based at least in part on the determined wireline communication priority level and one or more of the plurality of correlations; and transmitting the data to a mobile station according to the wireless communication priority level determined for the data.

52. A method for consistent forwarding of data across wireless and wireline networks, comprising:

storing a plurality of correlations between a set of wireline communication priority levels and a set of wireless communication priority levels;

receiving a request from a mobile station to communicate data, the request indicating a wireless communication priority level assigned to the data;

determining from the set of wireline communication priority levels a wireline communication priority level for the data based at least in part on the wireless communication priority level assigned to the data as indicated by the request and one or more of the plurality of correlations;

communicating the wireline communication priority level determined for the data to a wireless serving node;

receiving the data from the mobile station at a base station node via an air interface according to the wireless communication priority level assigned to the data, the base station coupled by the wireless serving node by a communications link;

allocating, based at least in part on the wireline communication priority level determined for the data, one or more channels associated with the communication link for communicating the data;

transmitting the data toward the wireless serving node via the one or more allocated channels of the communications link.

* * * * *